Feb. 19, 1935.  J. W. ARMOUR  1,991,441
DRIVING MECHANISM
Filed Oct. 31, 1932  2 Sheets-Sheet 1

INVENTOR
JAMES W. ARMOUR
BY
Albert G. Blodgett
ATTORNEY

Feb. 19, 1935.     J. W. ARMOUR     1,991,441
DRIVING MECHANISM
Filed Oct. 31, 1932     2 Sheets-Sheet 2
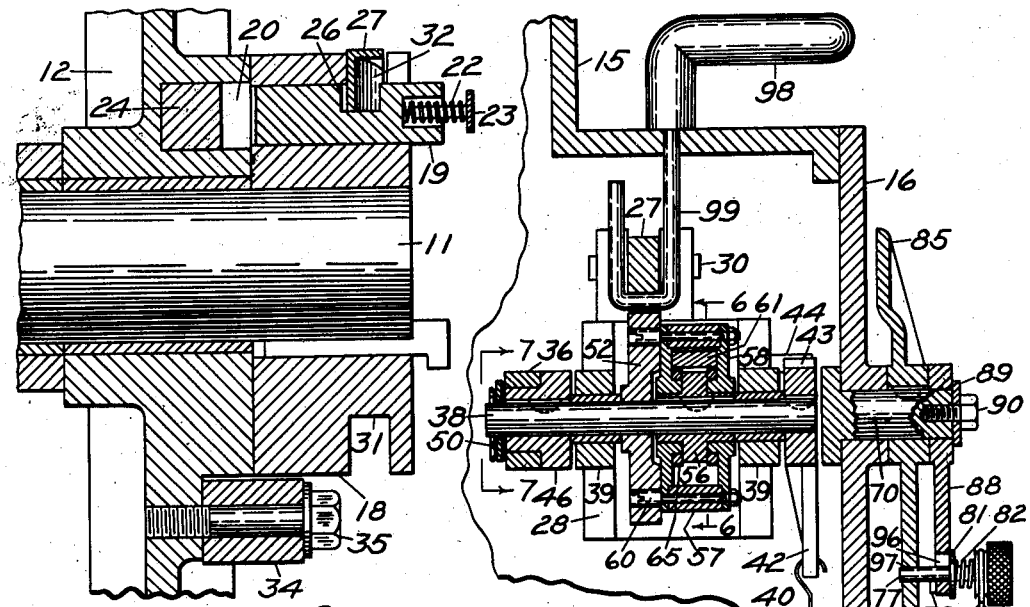
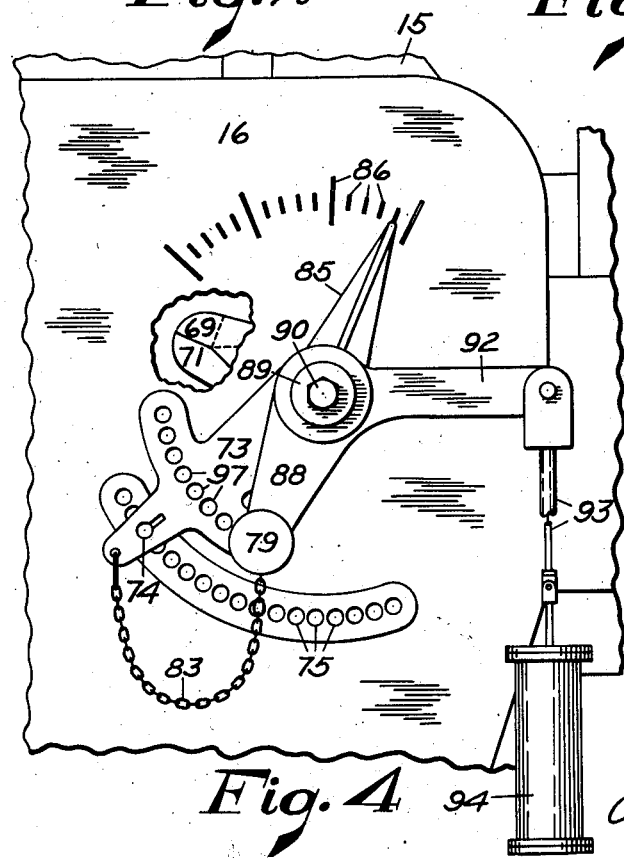
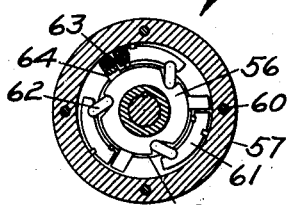
INVENTOR
JAMES W. ARMOUR
BY
Albert G. Blodgett
ATTORNEY Patented Feb. 19, 1935

1,991,441

UNITED STATES PATENT OFFICE 1,991,441

DRIVING MECHANISM

James W. Armour, Worcester, Mass., assignor to Riley Stoker Corporation, Worcester, Mass., a corporation of Massachusetts Application October 31, 1932, Serial No. 640,418

4 Claims. (Cl. 74—124)

This invention relates to driving mechanisms, and more particularly to a mechanism for producing an intermittent movement in a driven member, such as the crankshaft of an underfeed stoker.

One prior construction of this type comprises a clutch arranged to connect the driving and driven members, the clutch being engaged at predetermined intervals by a timing device including a pawl and ratchet mechanism having an adjustable pawl shield. With such an arrangement, the fineness of adjustment obtainable is limited by the spacing of the ratchet teeth, which must be made large enough to provide sufficient strength. Several strokes of the pawl are necessary to give a complete revolution of the ratchet, so that continuous actuation of the driven member is not possible. Furthermore, the only adjustment is a manual positioning of the pawl shield, and the construction is not adaptable to automatic control.

In order to overcome these difficulties, it has been proposed to hold the clutch out of engagement by means of a latch, and to release the latch at predetermined intervals by means of a straight line friction ratchet, both the rate of advance of the ratchet and its total travel being adjustable. While this construction has certain operating advantages, it is complicated and expensive to manufacture, and has in some cases been found unreliable in operation.

It is accordingly one object of the invention to provide a simple, inexpensive and reliable mechanism which will serve to actuate a driven member at predetermined intervals.

It is a further object of the invention to provide a mechanism of this type including a manually operable device which will permit continuous actuation of the driven member when desired without affecting the normal adjustment of the mechanism.

It is a further object of the invention to provide a driving mechanism in which the rate of actuation of the driven member may be controlled either automatically or manually, the parts being so constructed and arranged that the control may be easily and simply shifted from one form to the other.

It is a further object of the invention to provide a simple means for varying manually the rate of actuation of the driven member for a given position of the automatic control mechanism.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a side elevation of a driving mechanism, the cover plate and associated parts being removed;

Fig. 2 is a section on the line 2—2 of Fig. 1;

Fig. 3 is a section on the line 3—3 of Fig. 1, with the cover plate and associated parts in place;

Fig. 4 is a side elevation of the mechanism, partly broken away for clearness of illustration;

Fig. 5 is a perspective view of an adjustable stop;

Fig. 6 is a section on the line 6—6 of Fig. 3; and

Figures 1, 7:
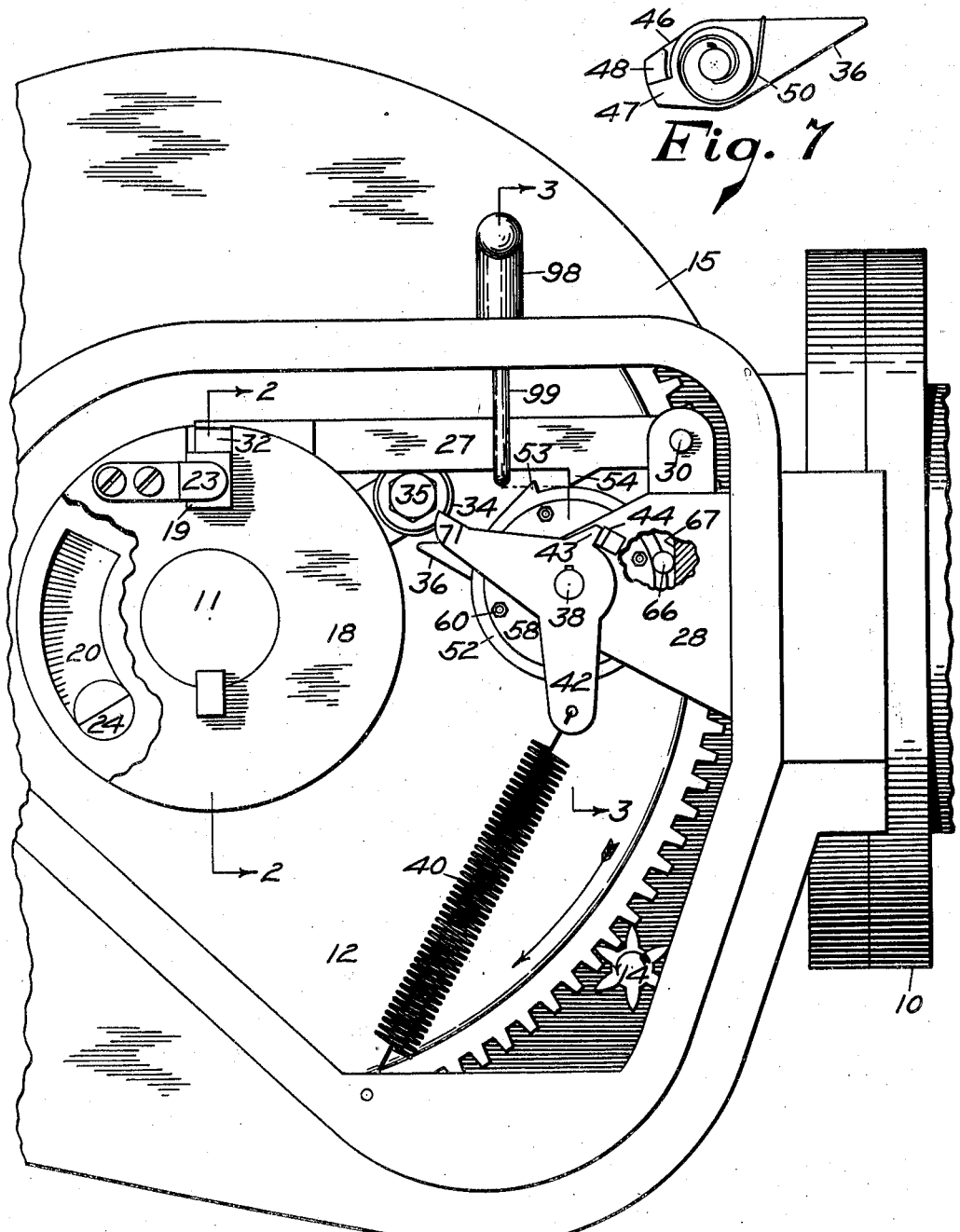
Fig. 7 is a view on the line 7—7 of Fig. 3.

In the drawings I have shown a mechanism particularly adapted for driving the reciprocable fuel feeding ram of an underfeed stoker. The embodiment illustrated comprises the usual stoker ram casing 10 and a rotatable crankshaft 11 mounted in front of the ram casing and arranged to actuate a ram (not shown) slidable within the ram casing. The crankshaft 11 forms a driven member which is rotated intermittently at predetermined and variable time intervals. The driving member for the crankshaft is shown as a gear 12 supported on the crankshaft and rotated in the direction of the arrow by means of a pinion 14, which is driven by any suitable source of power. The gear and pinion are preferably enclosed in a housing 15 provided with a removable cover plate 16.

In order that the crank shaft 11 may be connected to the gear 12 at intervals, I provide a suitable clutch mechanism which in the preferred form comprises a clutch block 18 keyed to the crankshaft in a position laterally adjacent to the gear and slidably supporting a clutch bolt 19. The gear 12 is formed with a recess 20 in the side toward the clutch block, and the slidable bolt 19 is urged toward the recess by means of a spring 22 supported by a bracket 23 on the clutch block. A hardened plug 24 is preferably inserted in the gear at one end of the recess 20 to form a driving shoulder for contact with the bolt 19. The clutch bolt is formed with a transverse groove 26 shaped to receive one end of a horizontal lever 27, the other end of the lever being pivotally supported on a bracket 28 by means of a horizontal pin 30. The end of the lever adjacent to the clutch bolt 19 is positioned within an annular groove 31 in the block 18 and is formed with a beveled or wedge shaped surface 32 which engages one side of the groove 26 in the bolt 19. These parts are so constructed and arranged that if the lever 27 is lifted slightly to release the clutch bolt 19, the spring 22 will force the clutch bolt toward the gear 12, which is continuously rotating. When the recess 20 reaches a position opposite to the clutch bolt, the latter will enter the recess, thus engaging the clutch and causing the clutch block 18 and crankshaft 11 to rotate. If now the lever 27 is lowered to its former position, the parts will continue to rotate until the clutch bolt 19 strikes the beveled surface 32, whereupon the bolt will be withdrawn against the force of spring 22 and the rotation of the crankshaft will cease.

In order to lift the lever 27 automatically at predetermined intervals and thus cause intermittent rotation of the crankshaft 11, I provide a timing mechanism which is preferably actuated from the continuously rotating gear 12. The preferred construction illustrated comprises an abutment 34, shown as a roller supported on a screw 35 threaded into the gear 12. A dog 36 is located in the path of the roller 34, and arranged to be struck by the roller at each rotation of the gear. This dog 36 is supported by a shaft 38 parallel to the crankshaft 11 and mounted in a pair of spaced bearings 39 formed on the bracket 28. A tension spring 40 extends between the casing 15 and an arm 42 keyed to the shaft 38. With this arrangement, the roller 34 will strike the dog 36 at each rotation of the gear and turn the shaft 38 in a counter-clockwise direction in Fig. 1. As soon as the roller leaves the dog, the spring 40 will turn the shaft back to its original position. Clockwise movement of the shaft is limited by a lug 43 on the arm 42 and a cooperating stop 44 on the bracket 28 (Fig. 1).

There is a possibility that a careless operator might connect the driving means in such a way as to rotate the gear 12 in the wrong direction, and this would obviously cause breakage of the mechanism if the dog 36 were rigidly fastened to the shaft 38. For this reason I preferably mount the dog 36 on a hub 46 which is keyed to the shaft. The dog and hub are formed with cooperating lugs 47 and 48 (Fig. 7) which are normally held in contact by a spring 50 connecting the shaft with the dog. With this construction, if the gear 12 is incorrectly rotated, the roller 34 will simply swing the dog 36 about the hub 46 against the force of the spring 50, and no damage will result.

The oscillating movement of the shaft 38 in normal operation is utilized to produce uni-directional intermittent rotation of a cam 52 which, in the embodiment illustrated, is supported on the shaft 38 between the bearings 39. This cam 52 is formed with a tooth 53 projecting outwardly from its periphery, and the lever 27 is preferably provided with a downwardly projecting tooth 54 which lies in the path of the tooth 53, the arrangement being such that the tooth 53 will strike the tooth 54 at each rotation of the cam 52, thus lifting the lever 27 and causing the clutch bolt 19 to slide into engagement with the gear 12. The teeth 53 and 54 are shown with sharp outer corners, so that only a slight angular movement of the cam 52 is necessary to carry the tooth 53 out of contact with the tooth 54 and allow the lever 27 to drop back to its original position.

The cam 52 is driven from the shaft 38 through the medium of a ratchet mechanism which is preferably of the rotary friction type. The ratchet mechanism illustrated is of the type known commercially as the "Pitter Clutch", and comprises a central hub 56 keyed to the shaft 38 adjacent to the cam 52, an outer ring 57 surrounding the hub, and a pair of side plates 58 fastened to the ring 57 by means of bolts 60. The heads of the bolts 60 extend into openings in the cam 52, as shown in Fig. 3, and form a driving means for the cam. Three friction shoes 61 are mounted in contact with the inside of the ring 57, and struts 62 (Fig. 6) connect the shoes 61 with the hub 56. Springs 63 are located between the shoes 61 and radial lugs 64 on the hub. When the shaft 38 and hub 56 are turned in a counter-clockwise direction, the struts 62 cause the shoes 61 to bind between the ring 57 and shoulders 65 on the side plates 58, thus driving the cam 52. When the shaft is turned in a clockwise direction, the struts release their pressure on the shoes, which then slide relative to the ring. Reverse movement of the ring 57 is prevented by a small roller 66 (Fig. 1) which is wedged between the outer surface of the ring and a vertical surface 67 on the bracket 28. The springs 63 prevent any slack or lost motion in the ratchet mechanism.

With the construction as so far described, the cam 52 will be advanced through a fixed angular distance at each revolution of the gear 12, giving a fixed time interval between successive clutch engagements. It is desirable that means be provided for varying this time interval, and for this purpose I utilize an adjustable stop which limits the clockwise movement of the shaft 38 and thus controls the angular movement of the shaft. In the drawings I have shown a stop 69 having a cylindrical stem 70 and located in the path of an abutment 71 formed integral with the arm 42 on the shaft 38. The stem 70 is rotatably supported in the cover plate 16 in direct axial alignment with the shaft 38. An arm 73 is keyed to the stem 70 on the outside of the cover plate, and this arm is provided with an opening 74 which may be placed opposite any one of a series of spaced holes 75 formed in the cover plate and arranged in a circular arc having its center on the axis of the stem 70. A pin 77 may be passed through the opening 74 into a selected one of the holes 75 to lock the arm 73 in place. The opening 74 is preferably shaped as a keyhole, and the pin 77 is provided with a laterally projecting lug 78 which can only be passed through the opening 74 when the pin is turned to the correct position. The pin 77 is formed with a knurled head 79, and a washer 81 and spring 83 are mounted on the pin between the lug 78 and head 79. This spring provides sufficient friction to hold the pin in place after it has been inserted and then turned slightly with the lug 78 in the rear of the arm 73. A flexible chain 83 connects the arm 73 to the pin 77 to prevent accidental loss thereof. The arm 73 is provided with a pointer 85 which, in conjunction with markings 86 on the cover plate, serves to indicate the position of adjustment of the mechanism.

In many installations it is desirable to provide for an automatic as well as a manual adjustment of the stop 69. For this purpose I utilize an arm 88 which is rotatably supported on the outer end of the stem 70 and held in place by a washer 89 and a screw 90. A second arm 92 is integral with the arm 88 and connected by a rod 93 to an automatic regulator 94, which may be controlled by the steam pressure in the boiler being fired by the stoker. The arm 88 is provided with an opening 96 similar to the opening 74, and arranged to be placed opposite any one of a series of spaced holes 97 formed in the arm 73 and arranged in a circular arc having its center on the axis of the stem 70. By inserting the pin 77 through the opening 96 and into one of the holes 97, it is possible to connect the arm 73 with the automatic regulator 94, and the relative positions of these parts can be varied as desired.

At times it is desirable to operate the crankshaft 11 continuously for a short period, so that a large quantity of fuel may be delivered to the furnace quickly in preparing the fire for banking. For this purpose I provide a manually operable device for lifting the clutch release lever 27. This device comprises a handle 98 and a hook 99 extending downwardly from the handle and beneath the lever 27. The hook 99 is slidable vertically through the casing 15. It will be noted that this device is independent of the timing mechanism which normally lifts the lever 27 at predetermined intervals and as soon as the handle 98 is released the lever 27 will drop back to its original position and the timing mechanism will once more assume control of the fuel feed. In the meantime the adjustment of the stop 69 has remained undisturbed.

The operation of the invention will now be apparent from the above disclosure. The pinion 14 and the gear 12 are rotated continuously by any suitable source of power, such as an electric motor, and at each rotation of the gear the roller 34 will strike the dog 36 and turn the shaft 38 in a counterclockwise direction against the force of the spring 40. As soon as the roller moves out of contact with the dog, the spring 40 will return the shaft and dog to their original positions, which are determined by the adjustment of the stop 69 in the path of the abutment 71. The extent of oscillation of the shaft is controlled by the stop 69. When the shaft 38 is turned in a counterclockwise direction, the friction shoes 61 will grip the ring 57 and thus advance the cam 52. During the reverse movement of the shaft, the shoes are released and the ring 57 and cam 52 are held stationary by the roller 66. After a predetermined time interval the tooth 53 on the cam will strike the tooth 54 on the lever 27, lifting the lever momentarily and releasing the clutch bolt 19, which will thereupon be forced against the gear 12 by the spring 22. When the recess 20 arrives opposite to the clutch bolt, the latter will enter the recess, the plug 24 at the end of the recess will contact with the clutch bolt, and the crankshaft 11 will be driven through a complete revolution, thus feeding a charge of fuel into the furnace. As the crankshaft starts its revolution and the clutch bolt 19 moves from beneath the lever 27, the latter will drop back into the groove 31, and when the revolution is completed the clutch bolt will strike the beveled end 32 of the lever. This will withdraw the clutch bolt and stop the movement of the crankshaft.

If the rate of fuel feed is to be controlled automatically, the pin 77 will be inserted through the opening 96 and into one of the holes 97. This will connect the stop 69 directly with the automatic regulator 94. By selecting any desired one of the holes 97, it is possible to vary the position of the stop with respect to the regulator to give the best results. In case a manual control is desired, the pin 77 can be inserted through the opening 74 and into one of the holes 75. In this way the stop 69 can be locked in any desired position. Regardless of the adjustment of the stop, it is always possible to cause continuous rotation of the crankshaft simply by holding up the handle 98 manually, thereby maintaining the clutch bolt 19 in continuous engagement with the gear 12. The entire construction is simple, inexpensive, and reliable.

Having thus described my invention, what I claim as new and desire to secure by Letters Patent is:

1. A timing mechanism comprising a device to be actuated, a rotatable cam to actuate the device, a ratchet mechanism arranged to advance the cam through successive steps, an adjustable device to vary the length of said steps, an automatically actuated member, a stationary member, and means to connect the adjustable device either to the automatically actuated member or to the stationary member.

2. A timing mechanism comprising a device to be actuated, a rotatable cam to actuate the device, a ratchet mechanism arranged to advance the cam through successive steps, an adjustable device to vary the length of said steps, an automatically actuated member, a stationary member, and manually operable means to connect the adjustable device either to the automatically actuated member or to the stationary member.

3. A timing mechanism comprising a device to be actuated, a rotatable cam to actuate the device, a ratchet mechanism arranged to advance the cam through successive steps, an adjustable device to vary the length of said steps, an automatically actuated member, a stationary member, and manually operable means whereby the adjustable device may be connected either to the automatically actuated member or to the stationary member but not to both at the same time.

4. A timing mechanism comprising a device to be actuated, a rotatable cam to actuate the device, a ratchet mechanism arranged to advance the cam through successive steps, an adjustable device to vary the length of said steps, an automatically actuated member, a stationary member, and manually operable means to connect the adjustable device either to the automatically actuated member in any one of several relative positions or to the stationary member in any one of several relative positions.

JAMES W. ARMOUR.